United States Patent [19]

Weirich

[11] 4,313,463
[45] * Feb. 2, 1982

[54] PRESSURE-RELIEF VALVE DEVICE

[75] Inventor: Walter Weirich, Dortmund, Fed. Rep. of Germany

[73] Assignee: Gewerkschaft Eisenhütte Westfalia, Lünen, Fed. Rep. of Germany

[*] Notice: The portion of the term of this patent subsequent to Aug. 18, 1998, has been disclaimed.

[21] Appl. No.: 133,483

[22] Filed: Mar. 21, 1980

[30] Foreign Application Priority Data

Apr. 12, 1979 [DE] Fed. Rep. of Germany ....... 2914981

[51] Int. Cl.³ ............................................. F16K 15/06
[52] U.S. Cl. .................................. 137/538; 137/494;
251/DIG. 1; 277/188 A
[58] Field of Search ...................... 137/494, 496, 538;
251/DIG. 1; 277/188 A

[56] References Cited

U.S. PATENT DOCUMENTS

| | | | |
|---|---|---|---|
| 2,437,814 | 3/1948 | Hallen | 277/188 A X |
| 3,132,869 | 5/1964 | Campbell | 277/188 A X |
| 3,482,594 | 12/1969 | Simon | 137/538 |
| 4,172,470 | 10/1979 | Walker | 251/DIG. 1 |

Primary Examiner—Robert G. Nilson
Attorney, Agent, or Firm—Thompson, Birch, Gauthier & Samuels

[57] ABSTRACT

A pressure-relief valve device, especially for use with hydraulic props, has a main hollow housing containing a guide piece with a through bore in which a cylindrical shank of a valve or piston member is received. The shank is slidable within the guide piece bore and is held, by a spring force applied to a head thereof, in a closed position. The shank has a blind axial bore leading through five, or preferably six radial borings to outlets at is periphery. An O-ring held in a groove in the wall of the guide piece bore engages on the peripheral surface of the shank. An elastic deformable thrust disc is located in the groove and contacts a wall of the groove adjacent the head of the valve member as well as the O-ring. The thrust disc serves to prevent creep of the O-ring during use whereby excess fluid pressure acts to displace the valve member against the restoring force of the spring to move the outlets of the shank of the valve member passed the O-ring to allow pressure-relief.

11 Claims, 4 Drawing Figures

U.S. Patent     Feb. 2, 1982     4,313,463
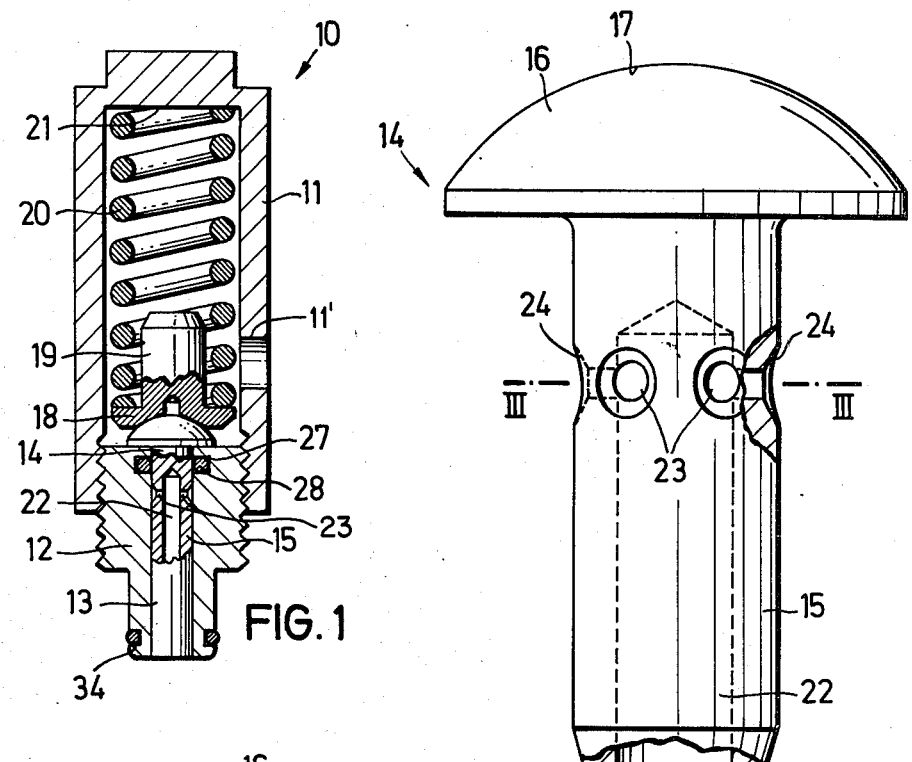
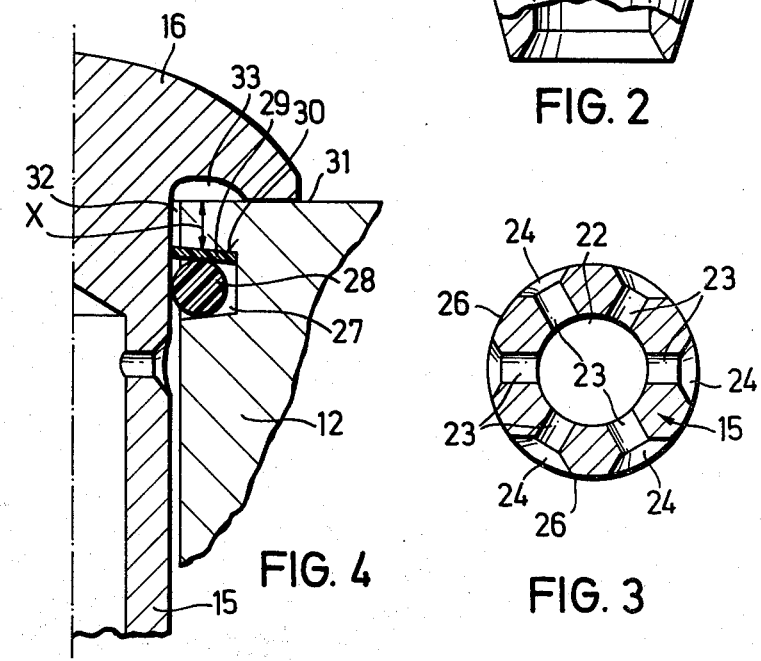
FIG. 1
FIG. 2
FIG. 4
FIG. 3

PRESSURE-RELIEF VALVE DEVICE

BACKGROUND TO THE INVENTION

The present invention relates to a pressure-relief valve device, particularly for use with hydraulic props. Various hydraulically operated units of mine equipment need to be protected against excessive pressure. This is especially the case with hydraulic props which support the roof of a mine working. Normally such props utilize pressure fluid—usually oil-water emulsions—at a pressure in the range 200-600 bars. Under adverse conditions, the pressure in the working chamber of a hydraulic prop may rise suddenly. A small compact pressure relief valve device connected to the working chamber can relieve excess pressure and protect the prop should the pressure rise. Known valve devices operate entirely automatically and open and close according to the prevailing pressure. An example of a pressure-relief valve device is described in German Gebrauchsmuster No. 1945206.

Exacting demands are made on the valve devices for relief of pressure since they are expected to perform reliably over long periods of time and they are expected to remain highly sensitive to pressure variation despite the harsh conditions encountered in the mine working environment. Conventional pressure-relief valve devices adopted in mine workings for the relief of hydraulic props perform quite adequately but are only designed for comparatively small flows of hydraulic pressure fluid. This is not generally a disadvantage, however, since in the event of a pressure rise and an overload only a small quantity of pressure fluid needs to be removed to restore the pressure to a safe level. Nevertheless, where the hydraulic props are exposed to a normal setting load which is in the same order of magnitude as the relief setting at which the pressure-relief valve devices are adjusted to respond; problems can arise where the devices can only pass pressure fluid at a relatively low flow rate. Indeed in this case during the actual prop setting operation the relief devices can respond and would then need to convey the large quantities of fluid passing through the pressure feed line. There is thus a need for a pressure-relief valve device which will be able to transfer larger quantities of fluid—in the order of 50 liters per minute—than hitherto while still preserving the efficiency reliability and durability which is needed.

A general object of the present invention is to provide an improved pressure-relief valve device.

SUMMARY OF THE INVENTION

A pressure-relief valve device constructed in accordance with the invention has a main housing with a guide piece located therein. The guide piece has a bore therethrough which contains a slidable valve or piston member. The valve member itself possesses an axial bore and radial borings opening into outlets at its periphery. The outlets can be frusto-conical recesses or enlargements opening radially outwards from the borings. A groove in the wall of the bore in the guide piece contains an O-ring which slidably engages with the periphery of the valve member to form a seal.

A spring acts on the valve member to maintain the outlets at one side of the seal corresponding to the normal closed condition of the device. By allowing the pressure of the pressure fluid to displace the valve member along the bore of the guide piece against the spring force the outlets can be brought to the other side of the seal to permit discharge of fluid through the device. In accordance with the invention, there are a multiplicity of radial borings in the valve member and generally at least five and preferably six borings are provided. In addition a resiliently deformable thrust ring is located in the groove in the wall of the bore of the guide piece to contact both the O-ring and a flank wall of the groove adjacent the other, opening, side of the seal. By providing a large number of radial borings in the valve member the overall fluid flow cross-section of the device is substantially increased thereby enabling relatively large flow rates to be achieved. This increased flow rate capability is achieved without increasing the dimensions of the valve device or any of its components parts relative to conventional devices. The displacement of the valve member when pressure relief occurs can lead to a partial throttled or fully-open cross section depending on the position of the fluid outlets with respect to the O-ring seal. Because of the higher flow rates and working pressures encountered during use the O-ring would tend to creep and become pushed into the narrow clearance gap between the valve member periphery and the guide bore resulting in high wear. The presence of the thrust ring however prevents the creeping of the O-ring.

The thrust ring can be designed to undergo an elastic lateral deformation which decreases its inner diameter to close off the clearance gap between the valve member and the guide bore to inhibit the O-ring from moving into the gap. The thrust ring can be a simple plain flat disc made from resilient, wear resistant plastics material with a typical thickness of 0.8 mm.

It is desirable that the flank walls of the groove in the wall of the guide bore which receives the O-ring and the thrust ring diverge outwardly from one another in a direction radially outwards and towards the valve member external periphery. Conveniently, the groove flank wall which supports the thrust ring inclines at a small angle of about 2° to 4° to a true radial plane. This divergence assists the deformation of the thrust ring into the clearance gap between the groove bore and the valve member.

The valve member can have an enlarged head held on an end face of the guide piece by the spring. Conveniently, this head is domed and contacts a cup or socket in a pressure plate engaged by the spring. In a preferred embodiment of the invention, the groove flank wall which supports the thrust ring is arranged at a small distance from the end face of the guide piece which is less than the width of the groove.

The head of the valve member is then made to have an outer diameter larger than the root diameter of the groove in the guide bore. This ensures the head of the valve member engages the guide end face under the spring force radially outwards from the groove. The head can be recessed as its underside adjacent the end face of the guide piece and adjacent to a shank or stem of the valve member which is provided with the radial borings, etc. This assists in ensuring the head bears on the end face essentially outside the groove. The engagement of the head on the guide end face as described permits the groove to be located as close as possible to the guide end face without the danger that the weakened region of the guide bore undercut by the groove would become deformed by the high closing force exerted by the spring on the valve member. Minimal distance between the groove and the guide end face has the advantage that the valve member need only be displaced by a small distance or stroke to open or close and thus a quick response can be provided to pressure change. These measures together with the throttle effect provided by the narrow gap between the wall of the guide bore and the valve member facilitates the creation of a pressure head on the outflow side of the O-ring so that in the closed condition of the valve device an equalization of pressure on the O-ring results.

To provide enhanced flow of fluid when the valve device opens it is preferable to construct the device so that the ratio between the diameter of the axial bore in the valve member and the diameter of each of its radial borings is at least 4:1. Furthermore it is preferable to have the ratio between the diameter of the guide bore and the axial bore in the valve member in the range 1.5:1 to 2:1.

As is known, the guide piece can be screwed into the main housing and can be positionally adjusted to vary the effective force of the spring to thereby control the pressure at which relief occurs.

The invention may be understood more readily, and various other features and aspects of the invention may become apparent, from consideration of the following description.

BRIEF DESCRIPTION OF DRAWING

An embodiment of the invention will now be described, by way of example only, with reference to the accompanying drawing, wherein:

FIG. 1 is a sectional side view of a pressure-relief valve device constructed in accordance with the invention;

FIG. 2 is an enlarged side view of the piston member of the device shown in FIG. 1;

FIG. 3 is a cross-sectional view of the piston member, the view being taken along the line III—III of FIG. 2; and FIG. 4 is an enlarged detail sectional side view of part of the device shown in FIG. 1.

DESCRIPTION OF PREFERRED EMBODIMENT

As shown in FIG. 1, a pressure-relief valve device constructed in accordance with the invention and generally designated 10 takes the form of a cartridge-like structure. The device 10 is composed of a cylindrical casing or housing 11 and a separate guide piece 12 which is screwed into the lower open end of the housing 11. The screw-threaded engagement between the guide piece 12 and the housing 11 permits the guide piece 12 to be screwed into the housing 11 to adopt various positions or unscrewed and detached therefrom. The interior of the housing 11 is preferably connected via an opening or port 11 to a pressure fluid return line (not shown).

The guide piece 12 has an axial bore 13 in which a cylindrical shank 15 of a valve or piston member 14 is received. As shown in FIGS. 2 and 3, the piston member 14 has a head 16 at the upper end of the shank 15. The head 16 is domed with a spherical outer surface 17 thus, resembling a calotte. The head 16 engages within a socket or cup 18 of a pressure plate 19 held within a housing 11.

A compression spring 20 is located within the housing 11. The spring 20 engages on the inside surface 21 of an upper end wall of the housing 11 and on a flange of the pressure plate 19 so as to urge the pressure plate 19 and the piston member 14 downwardly to maintain the device in its normally closed condition. As shown more particularly in FIGS. 2 and 3, the shank 15 of the piston member 14 is provided with an axial blind bore 22 which opens to the lower end face of the shank 15. The bore 22 terminates near the head 16 and communicates with six radial borings 23. These radial borings 23 are equispaced around the shank 15 and are provided with frusto-conical recesses or enlargements forming outlets 24 at the exterior periphery of the shank 15. As shown in FIG. 3, between each pair of outlets 24 of the borings 23 there is a web portion 26 with a outer surface forming part of the overall cylindrical guide surface of the shank 15 engaging in the bore 13 of the guide piece 12.

The ratio between the diameter of the axial bore 22 in the shank 15 and the diameter of each of the borings 23 is preferably at least 4:1. A typical diameter for the bore 22 is 4 mm. while that for each boring 23 is 1 mm. The ratio between the diameter of the bore 13, of the guide piece 12 and the diameter of the bore 22 is preferably in the range 1.5:1 to 2:1. Thus, where the diameter of the bore 22 is 4 mm., the diameter of the bore 13 is typically 7 mm.

As shown particularly in FIGS. 1 and 4, the bore 13 of guide piece 12 has an annular groove 27 near its upper end which receives a sealing ring in the form of an O-ring 28 which engages in sealing fashion with the outer periphery of the shank 15 of the piston member 14. The internal diameter of the O-ring 28 is substantially equal to or just slightly smaller than the diameter of the shank 15 so that only small frictional force is encountered. With the valve device in its normally closed state as shown in FIGS. 1 and 4, the head 16 of the piston member 14 is held against the upper face 31 of the guide piece 12 and the O-ring 28 locates on the periphery of the shank 15 between a recess 33 at the underside of the head 16 and the outlets 24 of the bores 23. A seal is thus established between the bore 22 and the interior of the housing 11.

A resilient deformable thrust ring 29 is located in the groove 27 in contact with the O-ring 28. Typically the thickness of the ring 29 is 0.8 mm. The ring 29 which is substantially flat and plain can be made from highly wear-resistant plastics material. The ring 29 is arranged in contact with the side flank 30 of the groove 27 nearest the upper face 31 of the guide piece 12 and is thus at the downstream or flow-off side of the seal. The flank 30 of the groove 27 which supports the ring 29 is spaced from the upper face 31 of the guide piece 12 by a minimal distance 'x' which is somewhat smaller than the axial width of the groove 27. This creates a narrow portion 32 of material between the groove 27 and the face 31 which is typically only 1 to 1.5 mm thick. In order to prevent deformation of the guide piece 12 in this weakened region 32, under the closure force of the spring 20, the lower face of the head 16 of the piston member 14 which engages on the upper face 31 of the guide piece 12 is recessed as indicated at 33 adjacent the shank 15 and is made larger in maximum diameter than the maximum root diameter of the groove 27 as shown in FIG. 4. This ensures the head 16 of the piston member 14 is supported on the face 31 of the guide piece 12 radially outwardly beyond the weakened region 32.

The lower part of the guide piece 12 is reduced to form a spigot 34 fitted with a further O-ring in a groove. During operation, the valve device 10 is utilized with the spigot 34 of the guide piece 12 engaged in a bore (not shown) of some other unit or a block or housing which communicates with the pressure chamber of one or more hydraulic props. The O-ring carried by the spigot 34 seals to the bore so that hydraulic fluid under the setting or working pressure of the prop or props acts on the piston member 14 via the bore 13 in the guide piece 12. The force produced on the piston member 14 by the hydraulic fluid pressure opposes the force of the spring 20. If the hydraulic fluid pressure should rise beyond a predetermined level the piston member 14 will be displaced along the bore 13 and the spring 20 will become more compressed. When the borings 23 in the shank 15 of the piston member 14 pass over the O-ring 28 pressure fluid can escape via the bore 22 and the borings 23 and the outlets 24 into the interior of the housing 11 and thence back to the fluid return line (not shown) conveniently connected therewith. It is also possible to allow the fluid simply to vent off from the housing 11. There is a progressive relief of excess pressure depending on the positioning of the outlets 24 with respect to the O-ring 28 and partial overlap between the outlets 24 and the O-ring 28 produces a certain throttling effect. Typically there exists a fixed clearance throttle gap of about 0.01 mm between the outer periphery of the shank 15 of the piston member 14 and the wall of the bore 13 of the guide piece 12 at least in the vicinity of the portion 32 of the guide piece 12.

Full free-flow of pressure fluid without throttling with a maximum relief cross-section is achieved when all the outlets 24 have become raised to clear the end face 31 of the guide piece 12 and hence communicate directly with the interior of the housing 11. Depending on the excess pressure prevailing the piston member 14 will hence adopt a stable position permitting outflow and should the pressure of the fluid fall again the piston member 14 will be displaced by the spring 20 back to its normal rest position with the bores 23 sealed off from the interior of the housing 11 by the O-ring 28.

The guide piece 12 can be positionally adjusted in relation to the housing 11 by virtue of its screw-thread engagement and this permits the effective force of the spring 22 to be varied thereby, enabling the value of pressure at which relief occurs to be controlled.

The thrust ring 29 serves to prevent creeping of the O-ring 28 into the clearance throttle gap between the outer periphery of the shank 15 of the piston member 14 and the wall of the bore 13 and consequential wear and destruction of the O-ring 28 especially under the high pressures (typically 300 to 500 bars) and flow rates which can be encountered in pressure relief in mining applications. During the pressure relief operation as discussed, the ring 29 will be subjected to pressure primarily directly from the O-ring 28 and will undergo elastic deformation reducing its internal diameter. The ring 29 thus moves into the clearance gap between the exterior periphery of the shank 15 and the wall of the bore 13 to inhibit the tendency of the O-ring 28 to creep into this gap.

As shown in FIG. 4 it is advisable to form the groove 27 with its side flanks (upper and lower in the drawing) tapered to diverge outwardly from one another in a direction towards the shank 15 of the piston member 14. This can be achieved, for example, by making the flank 30 extend at an angle of say about 2° to a true radial plane.

I claim:

1. A valve device for pressure-relief of hydraulic pressure fluid, and especially for pressure-relief of hydraulic props of mine equipment; said valve device comprising a main housing, a guide located in the main housing, the guide having a bore therein, a valve member received in the bore of the guide, an axial bore in the valve member which communicates via a multiplicity of radial borings with pressure fluid outlets at an external peripheral surface of the valve member, a groove in the wall of the bore of the guide, a sealing ring located in said groove to engage in sealing relationship with the peripheral surface of the valve member thereby, to establish a seal, the valve member being displaceable along the bore of the guide to bring the fluid outlets into axially spaced positions on one or other side of the seal, a head on the valve member, a spring located in the main housing to apply force to bias the valve member to a position with its fluid outlets at said one side of the seal and with its head engaging on an end face of the guide on the said other side of the seal, a resilient thrust ring located in said groove to contact both the sealing ring and a flank wall of the groove adjacent the said other side of the seal, said flank wall being spaced from the end face of the guide by a distance less than the axial width of the groove, with the external diameter of the head of the valve member being greater than the root diameter of the groove so that the engagement between the head of the valve member and the end face of the guide under the force of the spring extends radially outwardly beyond the groove, a main inlet for pressure fluid leading to the axial bore and radial borings and outlets of the valve member and a main outlet for pressure fluid leading to the other side of the seal, whereby the spring force holds the valve member in a position with its outlets on the said one side of the seal to isolate the main outlet from the main inlet and the valve member can be displaced by excess fluid pressure against the restoring force of the spring to bring its outlets to the said other side of the seal to permit flow of the pressure fluid from the main inlet to the main outlet with consequential pressure-relief.

2. A valve device according to claim 1, wherein the valve member is provided with at least five radial borings.

3. A valve device according to claim 1, wherein the head of the valve member is domed and received by a cup of a pressure plate acted on by the spring.

4. A valve device according to claim 3, wherein the head of the valve member is recessed adjacent a shank thereof having the axial bore and the radial borings and adjacent the end face of the guide.

5. A valve device according to claim 1, wherein the thrust ring is made from synthetic plastics material.

6. A valve device according to claim 1, wherein the thrust ring is a flat plain disc.

7. A valve device according to claim 1, wherein the ratio between the diameter of the axial bore in the valve member and the diameter of each of the radial borings in the valve member is at least 4:1.

8. A valve device according to claim 1, wherein the ratio between the diameter of the bore in the guide and the diameter of the axial bore in the valve member is in the range 1.5:1 to 2:1.

9. A valve device according to claim 1, wherein the flank walls of the groove in the bore of the guide taper to diverge away from one another in a direction towards the valve member.

10. A valve device according to claim 1, wherein the guide is in screw-threaded engagement with the main housing and can be positionally adjusted to vary the effective force of the spring thereby to control the value of pressure at which relief occurs.

11. A valve device according to claim 1, wherein the fluid outlets of the valve member are formed as frustoconical recesses diverging to increase in diameter relative to the radial borings.

* * * * *